Patented Dec. 30, 1941

2,267,911

UNITED STATES PATENT OFFICE 2,267,911

ICE CREAM

Donald P. Grettie and Warren D. Roth, Chicago, Ill., assignors to Industrial Patents Corporation, Chicago, Ill., a corporation of Delaware No Drawing. Application August 22, 1938, Serial No. 226,138

2 Claims. (Cl. 99—136)

This invention relates to improvements in ice cream, frozen confections and the like, and in methods of preparing such food products.

One of the objects of the present invention is to provide a method for preparing ice cream and the like whereby the percentage of overrun may be controlled.

Another object of the invention is to produce an ice cream product with improved texture.

Another object of the invention is to provide a method whereby overrun in the manufacture of ice cream products may be obtained in a shorter time than has been hitherto possible.

Other objects of the invention will be apparent from the description and claims which follow.

In the usual process of manufacturing ice cream, the mix is made up of liquid and dry ingredients. The liquid ingredients, such as cream, milk, unsweetened condensed skim milk, sweetened condensed skim milk, or condensed whole milk are mixed in the proper proportions so that the finished product will, after the dry ingredients have been added and are in solution, give the required amount of fat, sugar, serum solids, and stabilizer. The dry ingredients, such as sugar, skim milk powder, whole milk powder, gelatin, or gums, are triturated together and then added to the liquid ingredients, care being taken to avoid lumping.

After incorporation of the dry ingredients with the liquid ingredients the mix is pasteurized, homogenized, aged, and frozen. To secure a velvety texture in the finished product, it is desirable in the manufacture of ice cream to incorporate such agents as gelatin, egg yolk, or lecithin to cause the formation of finer ice crystals than would be formed in the absence of such agents.

Although such agents are more or less useful in developing the desirable finer ice crystals, it has been found difficult to control the amount of overrun and at times difficult to obtain as much overrun as is necessary to secure the best texture in the finished product.

The present invention contemplates the addition of small quantities of metaphosphoric acids or acidified salts of mataphosphoric acids to the ice cream mix. The addition of small amounts of these materials improves the texture and permits the desired overrun to be obtained in a shorter time than has heretofore been possible.

We contemplate the use of metaphosphoric acid and metaphosphates in all stages of complexity.

In the manufacture of ice cream, overrun is controlled by the use of an overrun scale. During the freezing process, small portions of ice cream are drawn out into a cup or container and weighed on the overrun scale. When the desired overrun is obtained, the ice cream is drawn from the freezer to be packed.

In the manufacture of ice cream in accordance with the present invention, the acid or a solution of the acidified salt may be added to the liquid ingredients or may be added to the mixture of liquid and dry ingredients. By way of illustration but not by way of limitation, we have found that the addition of a small amount of sodium hexametaphosphate acidified with metaphosphoric acid greatly improves the overrun of a standard commercial ice cream mix.

A standard commercial ice cream mix having an overrun of 86 per cent was treated by the addition of 0.18 per cent sodium hexametaphosphate and 0.02 per cent metaphosphoric acid. The overrun obtained in freezing the treated sample was 132 per cent. Although this overrun is far greater than ordinarily desired, it can be controlled by the addition of smaller amounts of the metaphosphates and metaphosphoric acid. The increase in overrun permits the withdrawal of the ice cream from the freezer in a shorter period of time, thereby decreasing the freezing time. The decrease in freezing time reduces the power consumption required and permits a more economical manufacture of ice cream.

We claim:

1. In the manufacture of ice cream to improve the overrun, the step of adding to the ice cream mix a mixture of about 90 per cent sodium hexametaphosphate and about 10 per cent metaphosphoric acid, said mixture being added in a small amount of the order of about 0.2 per cent based on the weight of the ice cream mix.

2. In the manufacture of ice cream to improve the overrun, the step of adding to the ice cream mix about 0.18 per cent sodium hexametaphosphate and about 0.02 per cent metaphosphoric acid based on the weight of the ice cream mix.

DONALD P. GRETTIE.
WARREN D. ROTH.